United States Patent [19]
Lawrence

[11] Patent Number: 5,257,652
[45] Date of Patent: Nov. 2, 1993

[54] FLUID COLLECTION SYSTEM FOR INSTALLATION UNDERGROUND AND METHOD OF INSTALLATION

[75] Inventor: James L. Lawrence, Exton, Pa.

[73] Assignee: Total Containment, Inc., Exton, Pa.

[21] Appl. No.: 942,904

[22] Filed: Sep. 10, 1992

[51] Int. Cl.⁵ .......................... B65B 1/04; B65B 3/04
[52] U.S. Cl. .......................................... 141/86; 141/1;
    141/88; 141/311 A; 220/276; 137/312;
    137/363; 137/372; 405/52; 405/128; 283/117
[58] Field of Search ................ 141/1, 85, 86, 88, 89,
    141/311 A; 220/86.1, 677, 267, 565, 276, 4.12;
    137/312, 363, 364, 372, 797, 571, 362; 405/52,
    128; 404/25, 26; 52/20, 98; 283/117; 4/695, 696

[56] References Cited

U.S. PATENT DOCUMENTS

| | | | |
|---|---|---|---|
| 1,639,495 | 11/1926 | Frame | 404/26 |
| 1,961,728 | 3/1932 | Arnest et al. | 247/19 |
| 2,911,001 | 11/1959 | Fuller | 137/362 |
| 3,362,425 | 1/1966 | Morris et al. | 137/362 |
| 3,390,224 | 9/1966 | Wyatt | 174/37 |
| 3,615,034 | 10/1968 | Lemelson | 220/267 |
| 4,089,139 | 5/1978 | Moffa et al. | 52/20 |
| 4,472,911 | 9/1984 | Jooris et al. | 404/25 |
| 4,971,225 | 11/1990 | Bravo | 141/86 |
| 5,002,428 | 3/1991 | Shettel | 405/39 |
| 5,040,408 | 8/1991 | Webb | 73/40.5 |
| 5,058,633 | 10/1991 | Sharp | 141/86 |
| 5,099,894 | 3/1992 | Mozeley, Jr. | 141/86 |
| 5,122,264 | 6/1992 | Mohr et al. | 137/363 |

*Primary Examiner*—Henry J. Recla
*Assistant Examiner*—Steven O. Douglas
*Attorney, Agent, or Firm*—Shlesinger, Arkwright & Garvey

[57] ABSTRACT

Fluid collection system for installation underground includes a first housing having a top, a wall extending downwardly from the top, and a first pipe-receiving opening in the wall at a predetermined vertical distance from the top. There is a second housing spaced apart from the first housing that has a top, a wall, and a second pipe-receiving opening in the wall. A number of interconnected segments is defined in the wall of the second housing. A pipe extends between the first and second pipe-receiving openings that has a slope great enough to cause fluids to flow along the pipe from the second housing to the first housing. The slope of the pipe is determined by a ratio defined by the length of the pipe and the difference between the predetermined vertical distance of the first housing and the variably fixed vertical distance of the second housing. In carrying out a method of installing the underground fluid collection system the respective tops of the first and second housings are installed substantially level with the surface, or the vertical difference between the top of the first housing and the top of the second housing is taken into account when determining how many segments to remove from the second housing to achieve the desired slope of the pipe.

18 Claims, 4 Drawing Sheets

FLUID COLLECTION SYSTEM FOR INSTALLATION UNDERGROUND AND METHOD OF INSTALLATION

FIELD OF THE INVENTION

This invention relates to a fluid collection system for underground installation, and a method of installing such a system.

BACKGROUND OF THE INVENTION

Industry has long recognized the advantages of storing fuel and other fluids underground. Storage underground has known advantages such as moderating thermal fluctuations of stored fuel owing to the surrounding earth serving as a heat sink, as well as maintaining open space above ground for other uses. For example, in a typical gasoline station, different grades of gasoline and diesel fuel are stored in underground tanks for distribution to above ground fuel pumps by an underground fluid piping system.

It has been recognized, however, that the underground storage of fluids is not problem-free. Leakage of hazardous fluids from tanks and pipelines is believed to cause environmental problems such as ground water contamination. Existing, aged, underground fluid distribution systems, many of which contain metal components, have been leaking not only at the many connector joints in the piping system, but have also been found to "rust out" and leak fluids into the ground.

Society is demanding elimination of the leaking of fluids, such as diesel fuel and gasoline from service stations, that harm the environment.

Furthermore, federal regulations will soon require that underground fuel distribution systems over a certain age be replaced.

U.S. Pat. No. 5,058,633 to Sharp discloses a spill containment assembly for the fill pipe of an underground storage tank. The Sharp device has a secondary containment chamber for containing any leakage through the fill pipes. The secondary containment chamber includes a corrugated sidewall portion capable of limited expansion and contraction to allow a degree of tolerance in the distance between the underground storage tank's top surface and a level ground surface cover for the chamber. The expansion capability allows the assembly to withstand a certain degree of ground movement such as comes from freeze/thaw situations without a cracking problem. Although the Sharp system undoubtedly works, any movement, however slight, may eventually lead to fatigue and cracking.

U.S. Pat. No. 5,040,408 to Webb discloses a secondary containment system using flexible piping that includes a hollow riser extension having scorelines, typically spaced inch apart, serving as cutting guide lines for height sizing. However, Webb discloses no use for such scorelines other than changing the height of the riser extension.

FEATURES AND SUMMARY OF THE INVENTION

It is a feature of the invention to provide a fluid collection system for overcoming the problems of existing systems.

It is a further feature of the invention to provide a method of installing an underground fluid collection system overcoming the drawbacks of known methods.

It is a still further feature of the invention to provide a fluid collection system which will help save the environment.

It is a yet still further feature of the invention to provide a fluid collection system which is relatively inexpensive, so that even poor independent gas station operators will be able to afford to retrofit their gas stations with the new system.

It is a further feature of the invention to provide a method of installing a fluid collection system which is easy to perform, whereby the speed of installation is increased, thereby reducing the downtime of a gasoline station when the system is being installed to reduce the amount of money lost by the gas station owner when the gas station is closed for installing the system.

It is a still further feature of the invention to provide a fluid collection system which is easy to install so that installation thereof is done correctly; the correct installation of such a system will achieve the objects of increased safety, proper functioning, saving of the environment, lengthening the life of the system, and increasing compliance with federal and state regulations.

It is a yet still further feature of the invention to provide a fluid collection system which can be installed without the use of complicated tools.

It is another feature of the invention to eliminate the need for cathodic protection of metal components.

It is yet another feature of the invention to provide a fluid collection system made of integral, plastic components to effectively eliminate movement resulting from changes in size owing to thermal expansion and contraction.

In summary, therefore, this invention is directed to a fluid collection system for underground installation that is environmentally friendly, inexpensive, easy to install properly, provides secondary containment of fluids, eliminates the need for supplemental cathodic protection of metal parts, and a method of installing such a system. The fluid collection system includes a first housing and a second housing spaced from the first housing. The second housing includes means for varying the distance between the top of the second housing and a pipe-receiving opening. A pipe connects the first and second housings. The slope of the pipe is determined by a ratio defined by the length of the pipe and the difference between the distance defined by the top of the first housing and a pipe-receiving opening in the first housing and the distance between the top of the second housing and the pipe-receiving opening in the second housing. The inventive method of installing an underground fluid collection system incorporates fundamental features of the fluid system according to the invention.

DETAILED DESCRIPTION OF THE INVENTION

Figure 1:
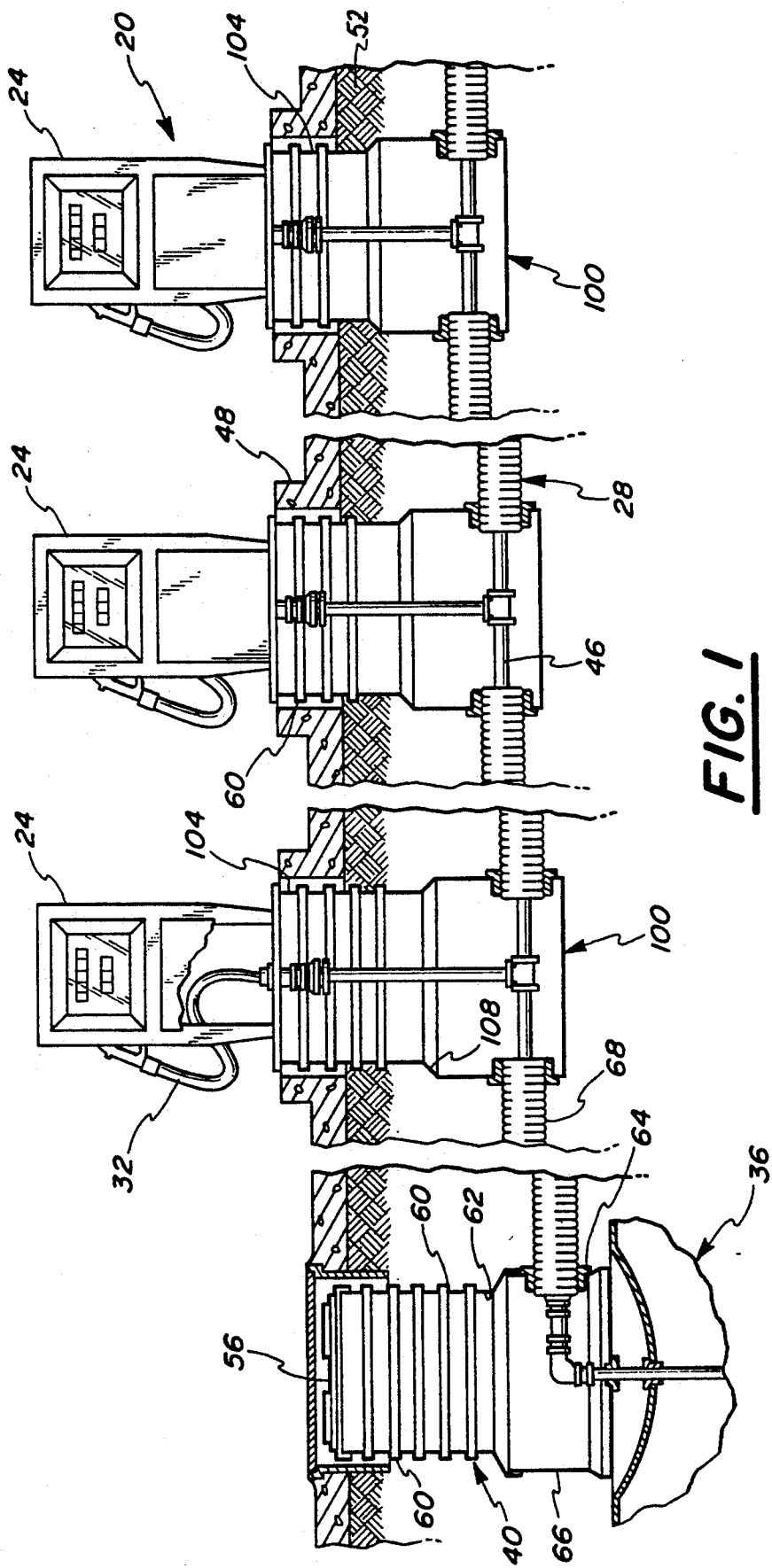
FIG. 1 is an elevational view, partially in section, of a fluid collection system according to the invention.
Figure 2:
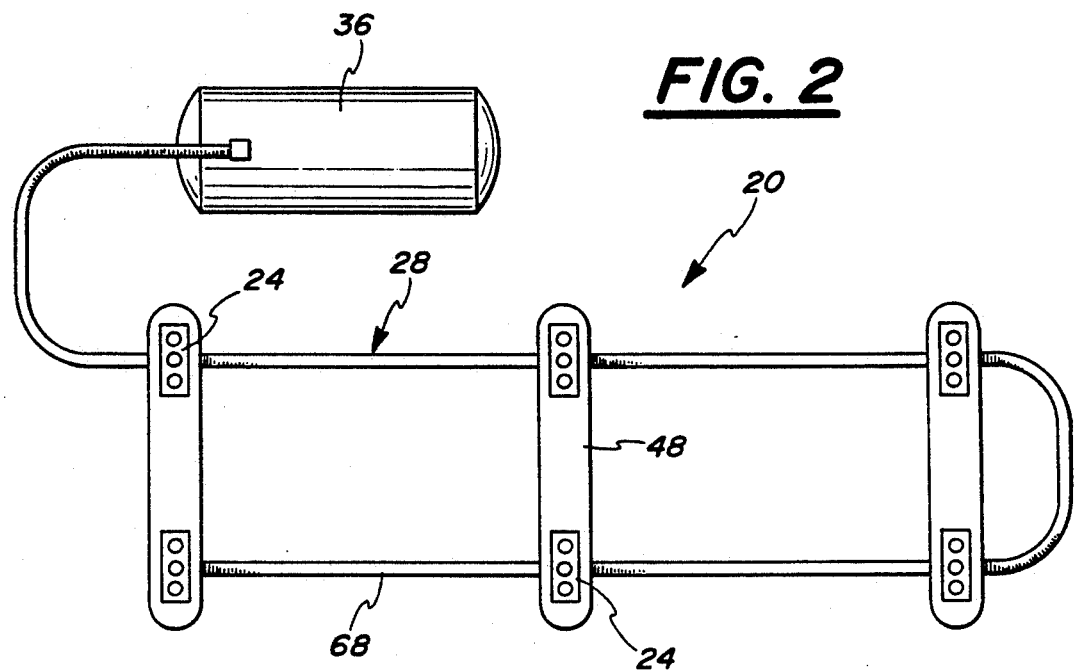
FIG. 2 is a schematic, top plan view of the fluid collection system according to the invention.

FIGS. 1 and 2 show underground fluid collection system 20 according to the invention. Fluid collection system 20 includes fluid dispensers 24, such as used for distributing a fluid product, e.g., gasoline. A piping system 28 fluidly connects each one of fluid dispensers 24 to each other, to a product dispenser hose 32 for each fluid dispenser 24, and to a fluid collection tank 36.

At one of the lowermost elevations in the distribution set up, a collection sump riser 40 is placed on top of fluid collection tank 36. For simplicity, only one secondary containment return line 44, and only one fluid supply line 46 for one of the fluid products to be dispensed by fluid dispensers 24, is shown in FIG. 2.

Fluid supply line 46 extends from a fuel supply tank (not shown) to product dispensing hoses 32, as is well known in the industry. In the case of a gasoline service station, for example, additional fluid supply lines and other undepicted components would be provided, such as for different grades of gasoline.

In the case of a typical gasoline station, a concrete island 48 is cast in place on the ground 52 and supports a pair of fluid dispensers 24.

Collection sump riser 40 includes a top 56 and a number of ribs 60 vertically spaced apart along up and upright wall 62. A pipe-receiving opening 64 is defined in a lower portion 66 of collection sump riser 40, for example. A pipe 68 of piping system 28 extends from collection sump riser 40 to dispenser sump 100.

A dispenser sump 100 is attached or hung beneath each of fluid dispensers 24. Dispenser sump 100 includes a riser 104 and a base 108. Dispenser sump 100 includes the basic functions of serving as a housing to which parts of piping system 28 are connected, as a housing in which fittings and joints of piping system 28 are contained, and as a secondary containment for fluids which leak from fluid dispensers 24, piping system 28, product dispenser hose 32, unnumbered joints and fittings, and fluid supply line 46, for example.

Figure 3:
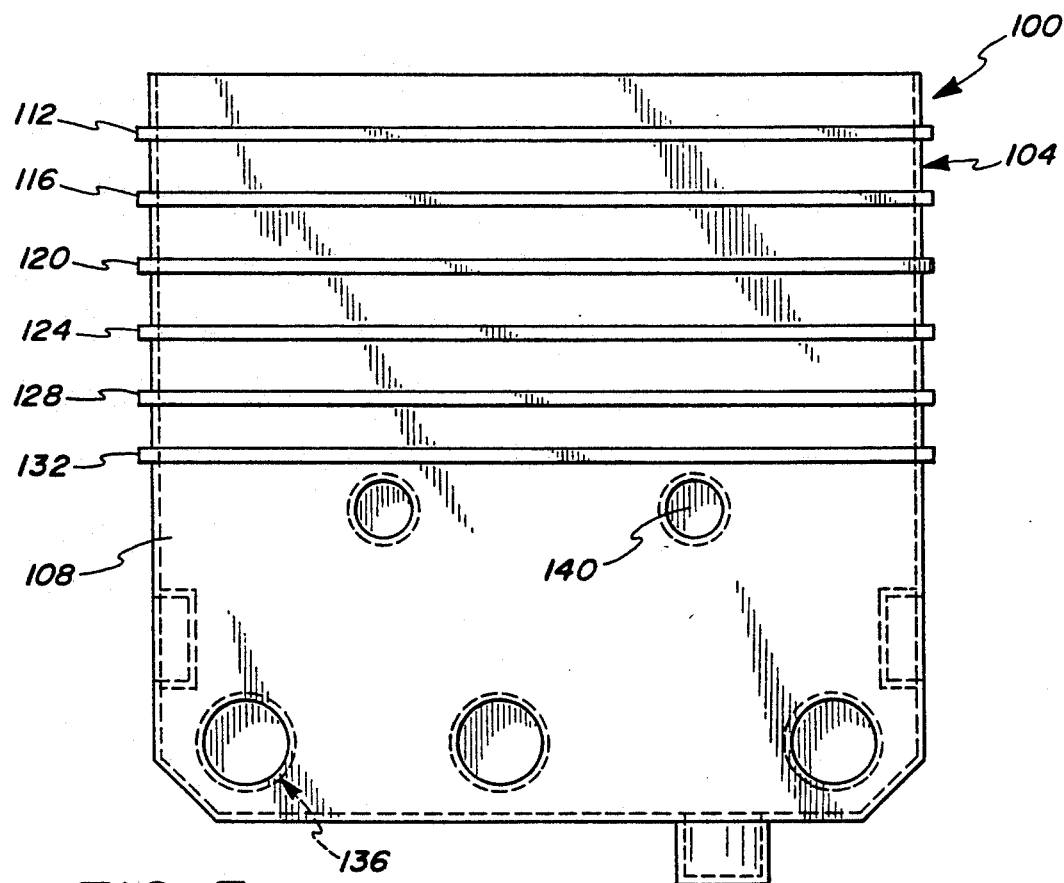
FIG. 3 is a side elevational view of a dispenser sump according to the invention.
Figure 4:
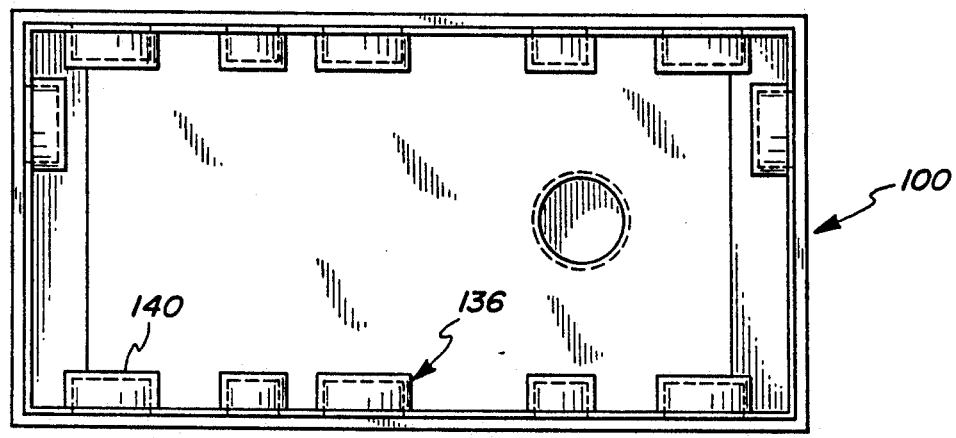
FIG. 4 is a top plan view of the dispenser sump of FIG. 3.

Turning to FIGS. 3 and 4, details of dispenser sump 100 will now be described. Dispenser sump 100 includes a plurality of ribs 112, 116, 120, 124, 128 and 132 defined on riser 104. A number of cuffs 136 having respective bottoms 140 is disposed in base 108 of dispenser sump 100 for receiving components of piping system 28 and other elements of underground fluid collection system 20, as will be described in detail below.

Figure 5:
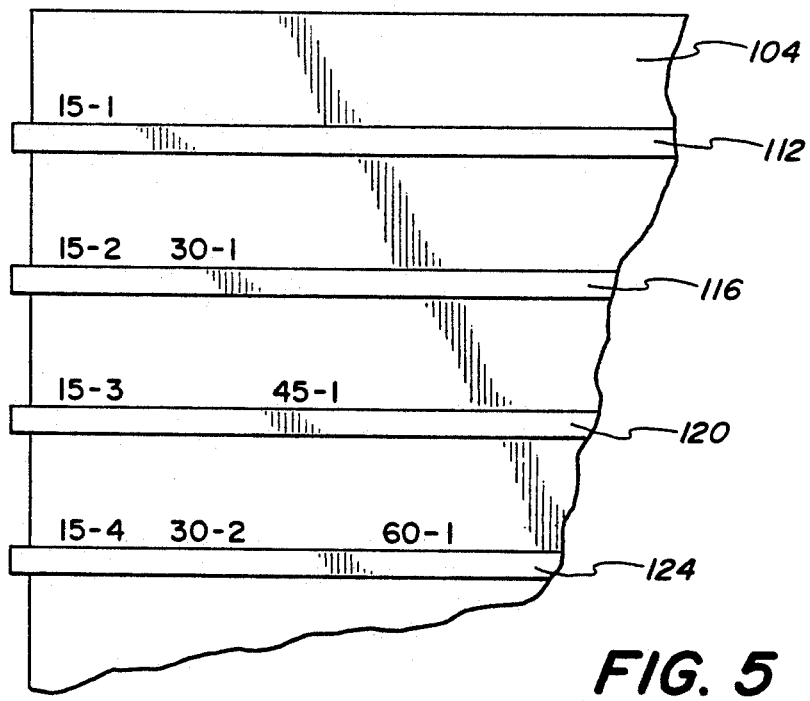
FIG. 5 is a partially broken away, sectional view of a part of the dispenser sump of FIG. 3, on an enlarged scale.

FIG. 5 shows a portion of dispenser sump 100 of FIG. 3 on an enlarged scale. In the embodiment of the invention shown in FIG. 5, rib 112 has been labeled with an alphanumeric symbol "15-1", rib 116 has been labeled "15-2" and "30-1", rib 120 has been labeled "15-3" and "45-1", rib 124 has been labeled "15-4", "30-2", and "60-1" for example. These designations, such as "15-1" come into play during the installation of underground fluid collection system 20 described below.

Briefly, the designation "30-1" on rib 116 means that rib 116 will be the rib which determines the depth at which dispenser sump 100 will be placed when dispenser sump 100 is the "number 1" sump; i.e., when dispenser sump 100 is closest to collection sump riser 40, and is at a distance of 30 feet from collection sump riser 40.

In the case of the distribution of gasoline, for example, piping system 28 is engineered to have a ⅛ inch per foot fall over a 30 foot pipe run. This ⅛ inch per foot slope is adequate for returning fluid gasoline to fluid collection tank 36, for example.

Figure 6:
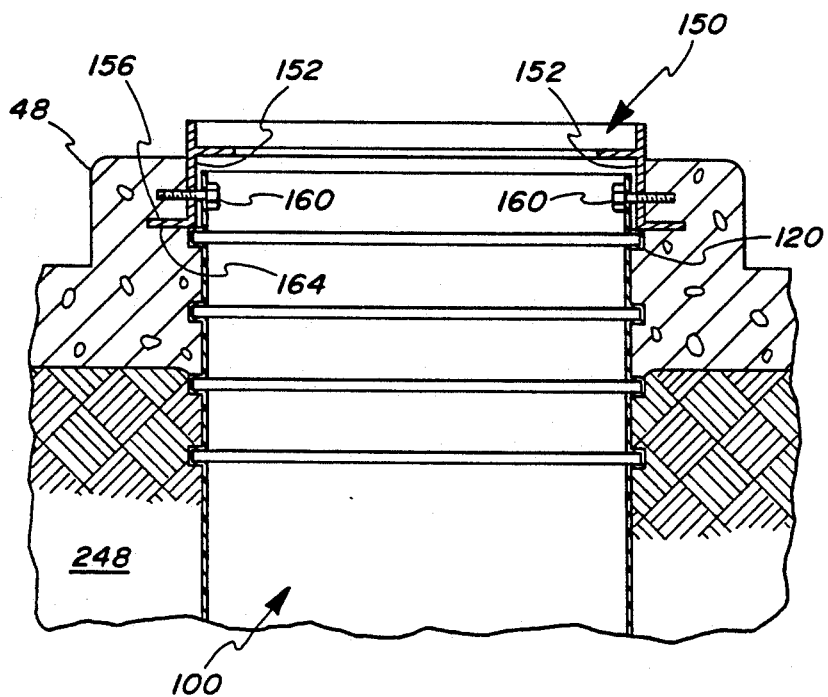
FIG. 6 is a partial sectional view of a portion of the dispenser sump according to the invention in conjunction with a top surround according to the invention.
Figure 7:
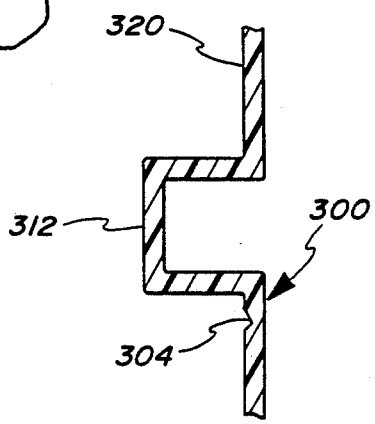
FIG. 7 is a partial view of another preferred embodiment of the invention.
Figure 8:
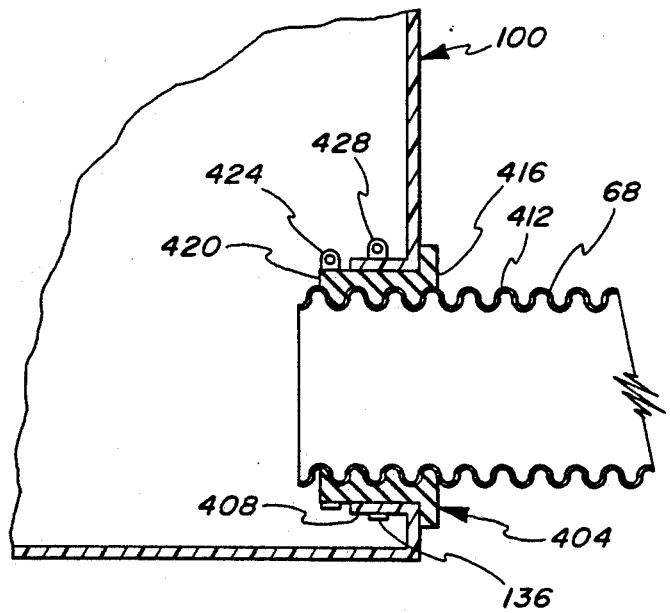
FIG. 8 is a partially broken away, sectional view of the fluid collection system of FIG. 1, on an enlarged scale.

FIGS. 6-8 illustrate additional details of the dispenser sump according to the invention.

FIG. 6 shows a top surround 150 mounted on an upper portion of dispenser sump 100. Top surround 150 includes a wall 152 extending downwardly for mating with rib 112, for example. An extension 156 of top surround 150 is embedded in island 48 and serves to support dispenser sump 100 by means of a fastener 160 passing through both dispenser sump 100 and wall 152 of top surround 150. As will be appreciated, in this embodiment rib 112 abuts a lower face 164 of extension 156.

FIG. 7 shows another preferred embodiment of a dispenser sump 300 according to the invention in which frangible portions 304 are defined adjacent the ribs, only one rib 312 being shown in FIG. 7, for simplicity. Frangible portion 304 make is easier to use dispenser sump 300 according to the invention by making an upper portion 320 easily separable from the remainder of dispenser sump 300, the separation being made in the vicinity of rib 312, for example. Frangible portion 304 may be configured as a groove, whereby the wall of sump 300 has a reduced thickness in this region.

FIG. 8 illustrates an exemplary means for retaining pipe 68 in dispenser sump 100 while preventing the escape of fluid from or the movement of fluid into the sump riser. Pipe 68 is retained by a gasket 404 including a plurality of mating portions 408 which are configured for sealingly engaging corrugations 412 on pipe 68. An extension 416 disposed on gasket 404 extends upwardly along base 108 of dispenser sump 100. A free end 420 of gasket 404 extends inwardly into dispenser sump 100. A hose clamp 424 encircles free end 420 and presses free end 420 against pipe 68. Similarly, a hose clamp 428 encircles cuff 136 and presses cuff 136 against gasket 404 and, accordingly, pipe 68. In this manner, pipe 68 is securely held in dispenser sump 100, likewise preventing movement of pipe 68 either inwardly or outwardly of dispenser sump 100, and while preventing undesirable movement of fluids between the engaging surfaces of cuff 136, gasket 404, and pipe 68, for example.

OPERATION

In use, fluid collection system 20 according to the invention will be installed underground as follows.

In the case of a gasoline service station to be retrofitted and upgraded, parts of the existing fluid collection system are removed, as necessary. Existing concrete islands 48 will generally be removed and then recast in place in ground 52.

The leftmost fluid dispenser 24 shown in FIG. 1 will have its associated dispenser sump 100 installed as follows.

If the leftmost fluid dispenser 24 is 15 feet away from fluid collection tank 36, and if the configuration of the embodiment of FIG. 6 is to be used, then the installer removes the portion of dispenser sump 100 labeled "15-1" as well as rib 112, such as by cutting or sawing through the material of dispenser sump 100.

Top surround 150 is then mated with dispenser sump 100 so that lower face 164 of wall 152 is near to or contacts rib 112 when top surround 150 is put in place. The installer attaches dispenser sump 100 to island 48 by attaching fastener 160 through wall 152 of top surround 150.

Conveniently, a reinforcing bar ("rebar") extension can be welded onto top surround 150 on site, when extra length is required. Generally dispenser sump 100 is placed on a bed of gravel, gravel or dirt 248 is backfilled against the lower exterior walls of dispenser sump 100, and then concrete island 48 is cast around extension 156. As will be readily apparent, concrete island 48 abuts wall 152 and portions of dispenser sump 100, such as shown in FIG. 6.

In the case where a ⅛ inch slope per foot fall in piping system 28 is desired, the distance between rib 112 and rib 116 will be 15/8 inches (i.e., 1⅞ inches). In other words, given the distance of 15 feet between dispenser sump 100 and collection sump riser 40, the 15/8 inch height difference will yield the desired ⅛ inch per foot fall in the fluid pipe runs between dispenser sump 100 and collection sump riser 40.

If top 56 of collection sump riser 40 is not collinear with the top of sump riser 100, such a non-collinear set-up being shown in FIG. 1, then an appropriate amount of an upright wall 62 will be removed prior to installation of collection sump riser 40 so that collection sump riser 40 and each of dispenser sumps 100 will effectively have a collinear common base line, as will be readily appreciated. For example, if the top surface of island 48 is six inches higher than the top 56 of collection sump riser 40, the installer simply cuts off six inches from the top of collection sump 40 at the outset of the installation procedure so that the desired slope between collection sump riser 40 and the first dispenser sump 100 is achieved when the remainder of the installation steps is carried out.

The installer will select appropriate one(s) of cuffs 136 for receiving the types of pipe to be used in piping system 28. After selecting the desired cuff 136, the user removes bottom 140 thereof, such as drilling out the bottom with a hole saw. Under normal circumstances, the installer will use the same one(s) of cuffs 136 with the same type of piping throughout the system; i.e., the respective counterpart cuff 136 (such as the lowermost and leftmost cuff shown in FIG. 3) of adjacent dispenser sump 100 will accommodate a common pipe.

A feature of the underground fluid collection system 20 according to the invention is that the system can be easily, accurately, and readily installed with a minimum of tools and mathematical calculations owing to the system of labeled ribs 112-128.

Even if fluid dispenser 24 and, hence, dispenser sump 100 are not evenly spaced apart, the installer can readily determine the proper number of ribs to remove from the dispenser sump. For example, if the dispenser sump 100 closest to fluid collection tank 36 is at a distance of 15 feet from the fluid collection tank, the material above rib 112 labeled "15-1" is removed, as described above.

If the next adjacent dispenser sump 100, the second dispenser sump away from fluid collection tank 36, is at a distance of 30 feet from first dispenser sump 100, then the installer removes the material above and including rib 120 that is labeled "45-1".

The installer readily recognizes that the material above and including rib 120 is the correct material to be removed by either recognizing that 15+30=45 and the second dispenser sump is at a distance of 45 feet from fluid collection tank 36, or, by the installer recognizing that the second dispenser sump 100 is equivalent to a first dispenser sump being spaced from fluid collection tank 36 at a distance of 45 feet (e.g., the installer making use of the "1" in the designation "45-1" in his or her thinking). Still further, the user can remove the correct amount of material simply by noting that second dispenser sump 100 located at a distance of 30 feet from the first dispenser sump which was located 15 feet from fluid collection tank 36 is equivalent to a third dispenser sump, each of which is spaced 15 feet apart, thereby removing the material rib 120 labeled "15-3", the installer thinking along those lines, or simply noting that $15 \times 3 = 45$.

Secondary containment pipes 68 are attached to dispenser sump 100 by removing bottom 140 of cuff 136, inserting gasket 404, and securing pipe 68 by tightening hose clamps 424 and 428.

As will be readily apparent from considering FIGS. 6 and 7, the installer will either remove the material of dispenser sump 100 at a short distance above or a short distance below the appropriate one of ribs 112, 116, 120, 124, 128 and 132 depending upon the manner in which the ribs have been labeled and the manner in which dispenser sump 100 has been engineered to mate with top surround 150.

When using dispenser sump 300 of FIG. 7, the installer will cut off upper portion 320 along with rib 312 by using frangible portion 304 as a guide for a cutting instrument or a material-removing tool. Alternatively, frangible portion 304 can be manufactured sufficiently weak relative to the remainder of dispenser sump 300 so that the installer simply breaks off rib 312 and upper portion 320 by fatiguing the material in the vicinity of frangible portion 304.

The material used for the dispenser sump is preferably a thin walled virgin high density polyethylene. Other strong plastics can be used, it being desirable that the material of the dispenser sumps provides dielectric isolation of any metal piping components, thereby eliminating the need for supplemental cathodic protection of metal parts. The dispenser sumps will have many different sizes and configurations depending on the intended use. The top surround for the dispenser sump will be made of metal or of an appropriate plastic based on the intended use. The ribs may be hollow or solid.

It is likewise contemplated that many other labeling systems for guiding the user as to which part of the dispenser sump to remove will be used, including different spacings between adjacent ribs for providing for different slopes of pipes in the piping system, as required. Further, it is contemplated that different labeling systems be molded into different sides of the typically four sided dispenser sump, especially when the labeling system corresponds to the cuffs (i.e., the means for defining opening) defined in the different sides of the dispenser sump. Still further, it is expected that the collection sump riser installed above the fluid collection tank likewise be provided with removable ribs that could be labeled with a numbering system for assisting in the sizing of the collection sump riser.

It is further contemplated that additional numbering systems be provided at smaller or larger intervals between the ribs so that different slopes and/or different spacings between the dispenser sumps can be accommodated. The numbering systems can be molded directly into the dispenser sump, or provided as stickers with printed on information, for example segments. In addition to the alphanumeric symbols described above, other symbols such as line segments, arrows of varying lengths, and bar graphs may be used to convey the information about intended depth and number of segments to remove. Additionally, a conversion table may be provided for calculating different slopes while using the numbering of the systems supplied on the dispenser sump. Other conversion tables could be used to assist the installer in determining how many segments to remove when, for example, too many segments were inadvertently removed from one of the housings, so that the other housings in the system could have appropriate numbers of additional segments removed to effectively eliminate the problem by making useable housings having nonstandard amounts of material used.

While this invention has been described as having a preferred design, it is understood that it is capable of further modifications, uses and/or adaptations of the invention following in general the principle of the invention and including such departures from the present disclosure as come within the known or customary practice in the art to which to invention pertains and as may be applied to the central features hereinbefore set forth, and fall within the scope of the invention and of the limits of the appended claims.

What is claimed is:

1. A fluid collection system for installation underground, comprising:
  a) a first housing having a top, a wall extending downwardly from said top, means for defining a first pipe-receiving opening through said wall at a predetermined vertical distance from said top, and said first housing being a collection sump, said collection sump being substantially larger than said first pipe-receiving opening;
  b) a second housing spaced apart from said collection sump;
  c) said second housing having a top, a wall extending downwardly from said top, and means for defining a second pipe-receiving opening through said wall of said second housing;
  d) means disposed on said second housing for defining a variably fixed incremental vertical distance between the top of said second housing and said second pipe-receiving opening;
  e) said incremental distance defining means including a plurality of interconnected segments defined in said wall substantially adjacent to and vertically spaced below said top of said second housing, and each one of said plurality of interconnected segments being severable from said second housing for defining said top of said second housing;
  f) a pipe disposed between said first and second pipe-receiving openings;
  g) said pipe having a predetermined length;
  h) said pipe having a predetermined slope, said slope being sufficiently great to cause fluids to flow along said pipe from said second housing to said first housing;
  i) said slope being determined by a ratio defined by the length of the pipe and the difference between said predetermined vertical distance of said collection sump and said variably fixed incremental vertical distance of said second housing; and
  j) wherein, when said fluid collection system is installed in ground having a substantially level surface, a number of said plurality of interconnected segments is severed from said second housing for determining said top of said second housing, and said top of said collection sump and said top of said second housing are each installed substantially level with the surface, whereby the slope of the pipe is determined, in part, by the number of segments severed from said second housing.

2. A fluid collection system as defined in claim 1, further comprising:
  a) frangible connection means disposed between said segments for causing said segments to be severable from adjacent segments.

3. A fluid collection system as defined in claim 2, wherein:
  a) said frangible connection means includes areas of reduced material thickness.

4. A fluid collection system as defined in claim 1, wherein said second housing comprises high density polyethylene.

5. A fluid collection system as defined in claim 1, wherein:
  a) said second housing comprises a dispenser sump.

6. A fluid collection system as defined in claim 1, wherein:
  a) a fuel storage tank is disposed substantially beneath said collection sump.

7. A fluid collection system for underground installation, comprising:
  a) a first housing having a top;
  b) means disposed in said first housing for defining a pipe-receiving opening therein, said first housing being substantially larger than said pipe-receiving opening;
  c) said pipe-receiving opening being disposed at a fixed vertical distance relative to said top of said first housing;
  d) a second housing having a top, an upper portion, and a lower portion, said second housing being substantially horizontally spaced apart from said first housing at a fixed horizontal distance, and said upper portion being a sump riser and said lower portion being a sump base;
  e) said second housing having means for defining a pipe-receiving opening in said lower portion and at a variably fixed vertical distance from said top;
  f) means disposed on said upper portion for defining a plurality of severable segments, each segment being vertically spaced apart from adjacent ones of said severable segments and from said pipe-receiving opening;
  g) a pipe having first and second spaced apart ends, said first end being disposed in said pipe-receiving opening of said first housing, said second end being disposed in said pipe-receiving opening of said second housing, and said pipe having a predetermined slope from its first end to its second end;
  h) said predetermined slope of said pipe being defined, in part, by a slope-defining vertical distance between said pipe-receiving opening of said first housing and said pipe-receiving opening of said second housing;
  i) said slope-defining vertical distance being defined by the vertical difference in length between said fixed vertical distance extending between said top of said first housing and its pipe-receiving hole and said variably fixed vertical distance extending between said top of said second housing and its pipe-receiving hole; and j) wherein, when said fluid collection system is installed underground, each respective top of said first and second housings is installed substantially collinear, whereby the slope of the pipe is determined by said slope-defining vertical distance.

8. A fluid collection system as defined in claim 7, further comprising:
a) frangible connection means disposed between said segments for causing each segment to be severable from adjacent segments.

9. A fluid collection system as defined in claim 8, wherein:
a) said frangible connection means includes areas of reduced material thickness.

10. A fluid collection system as defined in claim 9, wherein said second housing comprises high density polyethylene.

11. A fluid collection system as defined in claim 1, wherein:
a) said upper portion of said second housing comprises a sump riser; and
b) said lower portion of said second housing comprises a sump base.

12. A method of installing an underground fluid collection system, comprising:
a) providing a first housing having a top and means for defining a first pipe-receiving opening through said first housing at a fixed vertical distance from the top, said first housing being substantially larger than said first pipe-receiving opening;
b) providing a second housing, the second housing including a top, a wall extending downwardly from the top, means for defining a second pipe-receiving opening through the wall of the second housing, and an incremental vertical distance defining means including a plurality of interconnected segments defined in the wall;
c) removing at least one of the plurality of interconnected segments in the wall of said second housing to define a new vertical distance between the top and the second pipe-receiving opening;
d) placing said second housing at a predetermined distance from said first housing;
e) aligning the top of the second housing with the top of the first housing, thereby establishing a difference between the fixed vertical distance of the first housing and the new vertical distance of the second housing, whereby the ratio of the predetermined distance and said difference determines the slope of a pipe extending between the first and second housing; and
f) providing a pipe between the first and second pipe-receiving openings.

13. A method of installing an underground fluid collection system as defined in claim 12, further comprising:
a) providing an alphanumeric symbol on the wall of the second housing substantially adjacent each of the segments; and
b) removing at least one of the segments based on the distance from the first housing to the second housing and the alphanumeric symbol disposed adjacent the segment removed.

14. A method of installing an underground fluid collection system having a fluid drainage pipe of a predetermined slope, comprising:
a) providing a first housing having a top and means for defining a first pipe-receiving opening through said first housing at a predetermined vertical distance from the top, said first housing being substantially larger than said first pipe-receiving opening;
b) providing a second housing at a predetermined distance from the first housing, the second housing including a top, a wall extending downwardly from the top, means for defining a second pipe-receiving opening through the wall of the second housing, and an incremental vertical distance defining means including a plurality of interconnected segments defined in the wall adjacent to the top of the second housing;
c) providing a pipe between the first and second pipe-receiving openings; and
d) removing at least one of the plurality of interconnected segments in the wall of said second housing, thereby establishing a vertical distance between the top of the second housing and the second pipe-receiving opening, whereby the combination of the predetermined distance of the second housing from the first housing and the vertical distance determine the slope of the pipe provided in said providing step.

15. A method of installing an underground fluid collection system as defined in claim 16, further comprising:
a) providing alphanumeric symbols on the wall of the second housing substantially adjacent each of the segments, the alphanumeric symbols corresponding to different desired pipe slopes and to different distances between the first and second housings; and
b) removing at least one of the segments based on the distance from the first housing to the second housing and based on the alphanumeric symbol disposed adjacent the segment removed.

16. A fluid collection system for installation underground, comprising:
a) a first housing having a top, a wall extending downwardly from said top, and means for defining a first pipe-receiving opening through said wall at a predetermined vertical distance from said top, said first housing being substantially larger than said first pipe-receiving opening;
b) a dispenser sump spaced apart from said first housing;
c) said dispenser sump having a top, a wall extending downwardly from said top, and means for defining a second pipe-receiving opening through said wall of said dispenser sump;
d) means disposed on said dispenser sump for defining a variably fixed incremental vertical distance between the top of said dispenser sump and said second pipe-receiving opening;
e) said incremental distance defining means including a plurality of interconnected segments defined in said wall substantially adjacent to and vertically spaced below said top of said dispenser sump, and each one of said plurality of interconnected segment being severable from said dispenser sump for defining said top of said dispenser sump;
f) a pipe disposed between said first and second pipe-receiving openings;

g) said pipe having a predetermined length;
h) said pipe having a predetermined slope, said slope being sufficiently great to cause fluids to flow along said pipe from said dispenser sump to said first housing;
i) said slope being determined by a ratio defined by the length of the pipe and the difference between said predetermined vertical distance of said first housing and said variably fixed incremental vertical distance of said dispenser sump; and
j) wherein, when said fluid collection system is installed in ground having a substantially level surface, a number of said plurality of interconnected segments is severed from said second housing for determining said top of said dispenser sump, and said top of said first housing and said top of said dispenser sump are each installed substantially level with the surface, whereby the slope of the pipe is determined by the number of segments severed from said dispenser sump.

17. A fluid collection system as defined in claim 17, wherein:
    a) said first housing comprises a dispenser sump.

18. A fluid collection system as defined in claim 17, wherein:
    a) said first housing comprises a collection sump; and
    b) a fuel storage tank is disposed substantially beneath said collection sump.

* * * * *